Figure 1:
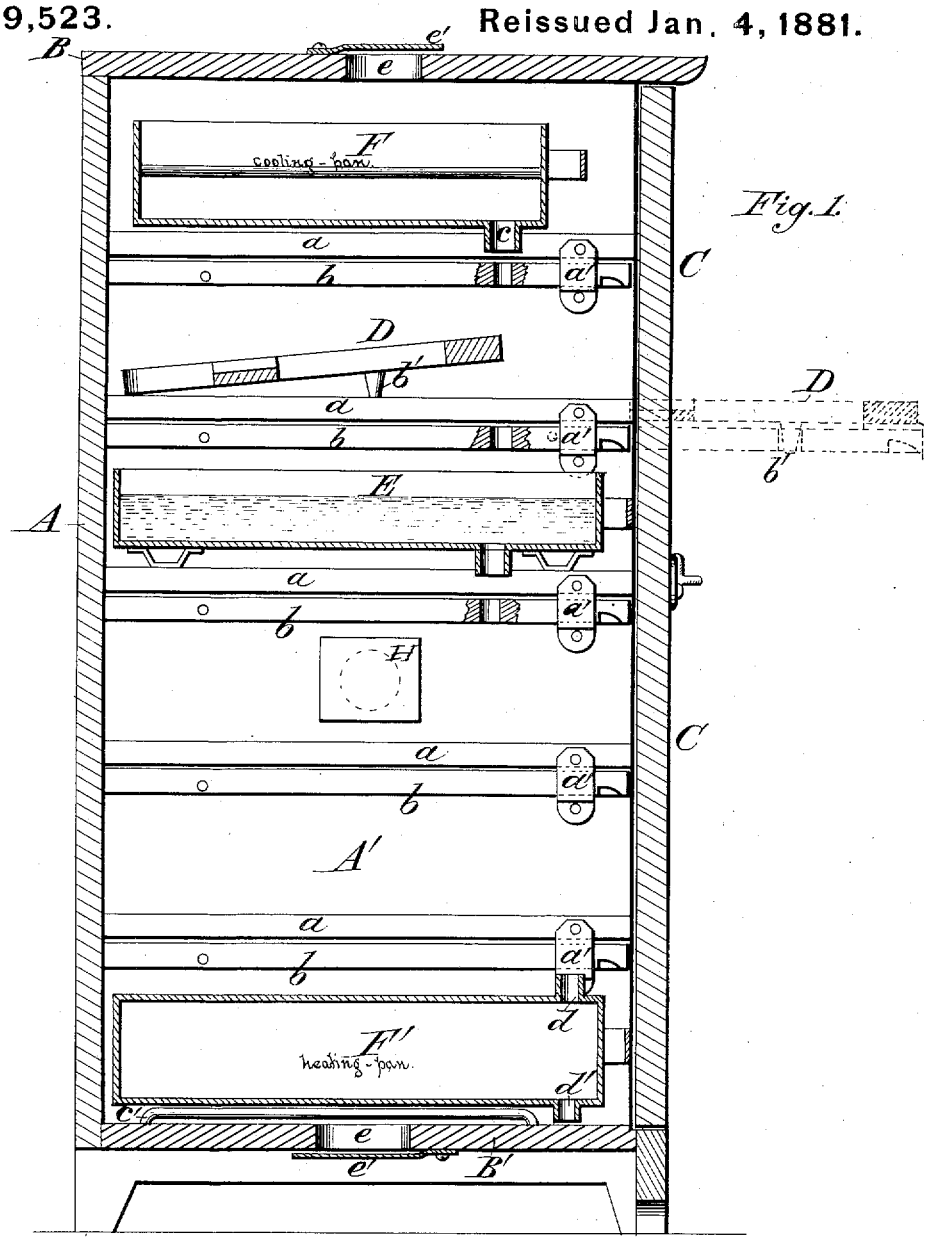

J. F. FERGUSON,

Assignor to the FERGUSON MANUFACTURING COMPANY.

Refrigerator.

No. 9,523. Reissued Jan. 4, 1881.

Attest:
H. H. Schott.
A. R. Brown

Inventor:
James F. Ferguson.
Geo. H. Tasker atty

UNITED STATES PATENT OFFICE.

JAMES F. FERGUSON, OF ESSEX, ASSIGNOR TO THE FERGUSON MANUFACTURING COMPANY, OF BURLINGTON, VERMONT.

REFRIGERATOR.

SPECIFICATION forming part of Reissued Letters Patent No. 9,523, dated January 4, 1881.

Original No. 181,326, dated August 22, 1876. Application for reissue filed November 21, 1879.

*To all whom it may concern:*

Be it known that I, JAMES F. FERGUSON, of Essex, in the county of Chittenden and State of Vermont, have invented certain new and useful Improvements in Refrigerators; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to that class of refrigerating devices employed by dairymen, in which milk, cream, and other products of the dairy may be kept at any proper temperature required for their preservation, or which may be suitable for the various processes pursued during the conversion of the milk into butter or cheese, the whole apparatus being of such construction that it may be called an insulated milk closet or bureau. In the upper part of this closet is placed a pan or reservoir for ice or cold water, and in the lower part one for hot water or some other heating agent, for the purpose of cooling or heating the interior of the closet to any desired temperature. If found preferable, hot freestones or any other suitable heating agent or apparatus may be employed in place of hot water, whenever it is desired to raise the temperature of the contents of the closet. The interior of this bureau or closet is protected from dust or insects by means of doors in front, which may be so hung as to expose the whole interior at once, if desired; or the number of doors may be increased so as to expose only a small portion of the interior, as a single shelf, if desired. An ample supply of pure air to the interior of the closet is always necessary, and is obtained by placing ventilators in its top and bottom. The interior is lighted by means of glazed openings in the sides or doors, or in both, according to the amount of light deemed necessary, and on the inside, against one of these glazed openings, or at a point where it may be observed through it, a thermometer may be placed, so that the temperature of the interior of the closet may be ascertained without opening the doors. The whole apparatus may be placed upon casters, so as to be readily moved from place to place, and in the construction of these casters, glass, gutta-percha, porcelain, or some other suitable non-conductor of electricity should be used, so that the whole bureau or closet may be insulated, such insulation being found to act as a preservative by preventing the milk from souring so quickly during thunder-storms.

Figure 2:
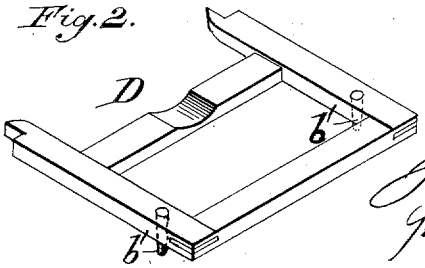

In the drawings, Figure 1 represents a vertical section of the closet from front to back, showing the method of arranging the several milk-supporting slides or shelves with relation to the cooling and heating appliances. Fig. 2 is a perspective view, showing one of the frames which rest upon the sliding supports and carry the milk-cans as they are pushed in or drawn out of the closet.

This bureau or closet is preferably constructed of wood, on account of its non-conducting properties, and is of rectangular shape. The back A and sides A′, together with the top B and bottom B′, are permanently secured to each other in any suitable manner, the front being closed by the door or doors C. Within this closet, and attached to the sides A′, are the horizontal cleats *a*. Secured at one end to these cleats, and at the other to the sides below the cleat, are the metal loops *a′*, sufficient space being left within the loops and beneath the cleats for the slides *b*, to which are detachably connected, by means of pins *b′*, entering suitable orifices in the slide, the frames D, which carry the milk-pans E or other articles which, for convenience, require their receptacle to be drawn out when the article is to be placed in or removed from the closet. It will be apparent that the use of these frames may be dispensed with when it is not necessary to draw the receptacles from the closet for the purpose of filling or emptying them; and, further, that the frame may be connected directly to the cleats *a* by a movable attachment, instead of resting upon the slides *b*, as shown in the drawings.

Supported by the upper pair of cleats are the slides, upon which is carried the ice-pan F, provided with a suitable outlet, *c*, in its bottom for the withdrawal of its contents when reduced to a fluid state, and resting upon the supports $c'$ in the bottom of the closet is the hot-water pan F′. This pan is provided with a tight cover to prevent the rising of steam or watery vapors therefrom, and is supplied with an inlet-tube, $d$, and outlet $d'$, through which its contents are replenished and drawn off from time to time, as may be required to preserve the desired temperature within the closet; but, as before stated, this hot-water pan may be replaced by any other suitable heating agent.

Ventilating-openings $e$ are formed in the top and bottom of the closet, which are closed to a greater or less extent by the covers $e'$, but are always left sufficiently open to insure perfect ventilation of the whole interior.

H shows one of the glazed apertures used for the purpose of admitting light to the interior of the closet and as a means of inspecting its contents when it is not desirable to open the doors for that object.

In constructing the ice and milk pans they are preferably made in a rectangular form, the corners being rounded for greater convenience in cleaning, and they may be provided with casters or rollers upon the bottom, to facilitate their removal from and replacement within the closet. When the heating apparatus is not required, the lower division of the closet occupied by it may be used as storage for jars of cream or butter.

The operation of the refrigerating devices is as follows: When the ice-pan is filled and the doors closed the temperature of the whole interior of the closet is soon reduced by the continuous currents of air, which, having become chilled by contact with the ice, descend and circulate throughout the interior, finally escaping by the ventilating-opening in the bottom of the closet, the strength of the air-current being regulated by opening and closing these openings at the top and bottom, as may be necessary to maintain an equable temperature. When it is desired to raise the temperature of the interior of the closet a similar circulation in an upward direction is produced by means of the heating agent placed in the lower division of the closet. Thus the temperature of the air within the closet and the articles around which it circulates may always be retained at that point which experience has shown to be the best for accomplishing the object in view.

It will be observed that the heating and cooling chambers at the bottom and top of my refrigerator may both be used at the same time, the two coacting to produce a temperature in the refrigerator which is a mean between them. For example, if the ice-chamber alone had been employed, with the ice at a temperature of 25° Fahrenheit for the cooling and preservation of certain articles in the interior of the refrigerator, and it was desired to remove such articles, and introduce, for example, milk in pans, and increase the temperature in the interior of the refrigerator to 40° Fahrenheit, such temperature could readily be obtained by introducing into the heating-chamber a heating agent having the temperature of 65° Fahrenheit, which, in connection with the ice at 25° Fahrenheit, would increase the temperature of the interior of the refrigerator containing the milk-pans to 40° Fahrenheit, the required temperature, the resulting temperature being the difference between 65° Fahrenheit and 25° Fahrenheit, which is 40° Fahrenheit. Thus it will be readily perceived that in my apparatus both the cooling and heating chambers are capable of being employed at the same time, and that each may be employed to coact with the other in producing a desired result—viz., in obtaining in the interior of the refrigerator a desired temperature equal to the difference between the temperatures of the cooling and heating agents in their respective chambers.

Having thus described my invention, I claim as new and desire to secure by Letters Patent the following:

1. A ventilated refrigerator provided with an upper cooling-chamber, a lower heating-chamber, and intermediate shelves or sliding frames, substantially as shown and described.

2. The combination of a heating-chamber with the lower part of a refrigerator-casing, substantially as and for the purpose set forth.

3. In a milk-receptacle, the combination of the frames D, slide $b$, cleats $a$, and loops $a'$, all arranged for joint operation in the manner shown and described.

In testimony that I claim the foregoing I have hereunto set my hand this 5th day of November, 1879.

JAMES F. FERGUSON.

Witnesses:

A. B. COGSWELL,

W. J. VAN PATTEN.